(12) United States Patent
Hong et al.

(10) Patent No.: US 6,198,608 B1
(45) Date of Patent: Mar. 6, 2001

(54) MR SENSOR WITH BLUNT CONTIGUOUS JUNCTION AND SLOW-MILLING-RATE READ GAP

(75) Inventors: Liubo Hong, San Jose; Kenneth E. Knapp, Livermore, both of CA (US)

(73) Assignee: Read-Rite Corporation, Milpitas, CA (US)

( * ) Notice: Subject to any disclaimer, the term of this patent is extended or adjusted under 35 U.S.C. 154(b) by 0 days.

(21) Appl. No.: 09/272,057

(22) Filed: Mar. 18, 1999

(51) Int. Cl.⁷ ........................................................ G11B 5/39
(52) U.S. Cl. ........................ 360/320; 360/324.12; 360/325
(58) Field of Search ................................. 360/320, 324.1, 360/325, 324.12

(56) References Cited

U.S. PATENT DOCUMENTS

| | | | |
|---|---|---|---|
| 4,368,496 | 1/1983 | Kato et al. | 360/110 |
| 4,413,295 | 11/1983 | Kato et al. | 360/110 |
| 4,947,541 | 8/1990 | Toyoda et al. | 29/603 |
| 5,099,376 | 3/1992 | Ino et al. | 360/120 |
| 5,198,949 | 3/1993 | Narisawa et al. | 360/126 |
| 5,329,413 | 7/1994 | Kondo et al. | 360/113 |
| 5,371,643 | 12/1994 | Yuito et al. | 360/113 |
| 5,438,470 | 8/1995 | Ravipati et al. | 360/113 |
| 5,475,551 | 12/1995 | Honda et al. | 360/120 |
| 5,481,422 | 1/1996 | Okayama et al. | 360/120 |
| 5,563,752 | 10/1996 | Komuro et al. | 360/113 |
| 5,576,098 | 11/1996 | Arimoto et al. | 428/332 |
| 5,639,509 | 6/1997 | Schemmel | 427/130 |
| 5,664,316 | 9/1997 | Chen et al. | 29/603.08 |
| 5,742,459 | 4/1998 | Shen et al. | 360/113 |
| 5,761,790 | 6/1998 | Carr et al. | 29/603.15 |
| 5,818,685 | 10/1998 | Thayambali et al. | 360/113 |
| 5,966,273 | * 10/1999 | Matsumoto et al. | 360/113 |
| 5,986,857 | * 11/1999 | Hirano et al. | 360/113 |

* cited by examiner

Primary Examiner—Jefferson Evans
(74) Attorney, Agent, or Firm—Mark Lauer

(57) ABSTRACT

A magnetoresistive sensor has a read gap that is made of a slow ion milling rate material. The slow milling rate read gap allows a blunt end to be formed for the sensor without excessive overmilling into the read gap. The read gap may also be formed of plural layers with at least one of the layers having a low milling rate. This allows the other read gap layer to have complimentary attributes, such as high thermal conductivity, low stress, less pinholes and/or better dielectric properties. The electromagnetic characteristics of MR sensors having such steeply sloped ends are enhanced both in reading signals and reducing noise. The track width of such a sensor can be more accurately formed due to the blunt shape of the contiguous junction, quantizing signals and reducing errors from reading adjacent tracks. The sensor can also be made to have a sharper linear bit resolution, due to a thinner, high-integrity read gap. Barkhausen noise is reduced, as well as signal biasing improved, with blunt contiguous junctions formed between the sensor ends and lead or bias layers.

24 Claims, 3 Drawing Sheets

MR SENSOR WITH BLUNT CONTIGUOUS JUNCTION AND SLOW-MILLING-RATE READ GAP

TECHNICAL FIELD

The present invention relates to electromagnetic transducers and magnetoresistive sensors.

BACKGROUND OF THE INVENTION

The employment of magnetoresistive (MR) sensors for reading signals from media is well known. Such sensors read signals from the media by detecting a change in resistance of the sensor due to magnetic fields from the media. Many variations of MR sensors are known, such as anisotropic magnetoresistive (AMR) sensors, dual stripe magnetoresistive (DSMR) sensors, giant magnetoresistive (GMR) sensors, spin valve (SV) sensors and dual spin valve (DSV) sensors.

Common to these sensors is the need to provide bias fields, both to eliminate noise and to facilitate signal readout. A known means for biasing the sensor involves abutting a permanent magnet to ends of the sensor, the magnet preferably forming a contiguous junction across plural sensor layers. Conductive leads, which may be separate from the biasing means, may also adjoin sensor layers along a contiguous junction.

In order to form a contiguous junction, a sensor is usually deposited in layers and then its border defined by masking and ion beam milling or etching (IBE), reactive ion etching (RIE) or the like. Ideally, milling could be performed that directs an ion beam exactly perpendicular to the surface on which the MR sensors are being formed, resulting in blunt sensor ends that terminate at a 90° angle to that surface. Redeposition of materials removed by milling and other complications interfere with this scenario, however, so that such exact etching is not practicable. Moreover, following such a perpendicular IBE the deposition of hard bias and/or conductor layers could blanket the mask, so that etching of the mask would be prevented and the necessary lift-off of these layers would become problematic.

A known means for forming a contiguous junction involves forming an undercut in the mask and rotating the IBE at an angle offset from 90°. FIG. 1 exemplifies this approach, in which a magnetic shield 20, insulative layer 22 and sensor 25 has been formed atop a substrate 27. A bi-layer resist 28 and 29 has been photolithographically patterned atop the layers that are to form the sensor 25, leaving an undercut 30 closest to the sensor. An IBE is directed at a relatively rotating angle to perpendicular to form a curved border 33 for which part of the insulative layer as well as all of the sensor layers have been removed. Dotted lines 35 and 37 represent directions of the rotating ion beam at opposite phases, and show that etching proceeds less beneath the mask where line 37 impinges but not line 35. The removal of part of layer 22 is termed overmilling. The undercut 30 allows etchant to remove the mask 28 even after deposition of hard bias and lead layers that cover the mask as well as adjoin the border 33 to form a contiguous junction.

The shallow slope of the resulting contiguous junction has a number of drawbacks. The oblique angle of the border defining the contiguous junction denigrates the bias field provided to the sensor and complicates the sensor domain structures, so that noise is not eliminated. The shallow slope also creates inaccuracy in the width of the sensor, which ideally should match the width of magnetic tracks on the media, called the "track width." Surprisingly, the length of the contiguous junction regions on both ends of the sensor can be comparable to or even greater than the width of the sensor between the contiguous junction regions, blurring images and causing off-track errors.

The contiguous junction 33 could be made more blunt along the sensor with additional ion milling into the insulative layer 22, also known as the read gap. Unfortunately this may result in electrical shorting between the shield and the hard bias and lead layers. The insulative layer 22 can be made thicker to allow for this overmilling, but the thickness of that read gap separating the sensor from the shield is a primary determinant of the resolution of the sensor. In other words, the sensor "sees" magnetic fields from the media that pass between the shields, and the closer the shields are to the sensor the more narrow the focus of the sensor. Thus an attempt to create a less oblique contiguous junction to solve the bias and resolution problems can result in other resolution problems and electrical shorting.

SUMMARY OF THE INVENTION

The present invention has a number of advantages, including creation of blunt contiguous junctions for MR heads, improving sensor performance. These advantages are achieved in part with a read gap material that has a substantially slower milling rate than conventional alumina. This slower milling rate allows a blunt contiguous junction to be formed along the sensor without excessive overmilling into the read gap. The read gap may also be formed of plural layers with at least one of the layers having a low milling rate. This can allow the other read gap layer to have complimentary attributes, such as high thermal conductivity, low stress, less pinholes and/or better dielectric properties.

The electromagnetic characteristics of MR sensors having such steeply sloped contiguous junctions are enhanced both in reading signals and reducing noise. The track width of such a sensor can be more accurately formed due to the blunt shape of the contiguous junction, clearing blurred signals and errors from reading adjacent tracks. The sensor can also be made to have a sharper linear bit resolution, due to a thinner, high-integrity read gap. Barkhausen noise can be reduced, as well as signal biasing improved, with blunt contiguous junctions. In sum, MR sensors of the present invention can achieve sharper resolution of both the length and width of magnetic bits, reduced noise, and enhanced signal readout.

DESCRIPTION OF THE PREFERRED EMBODIMENT

Figure 1:
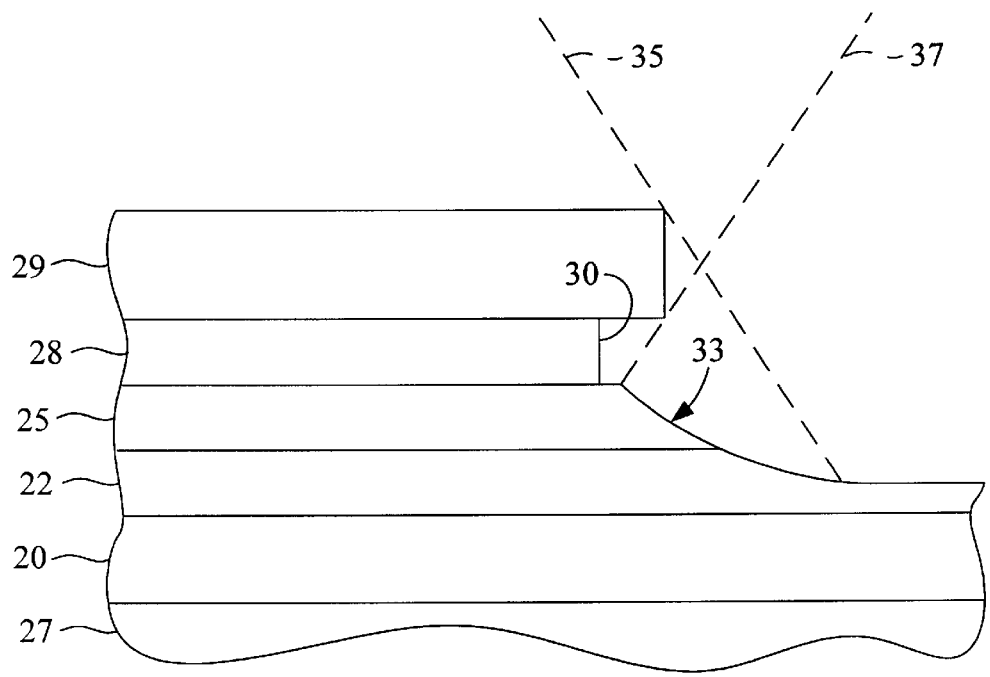
FIG. 1 shows a prior art method for forming a contiguous junction.
Figure 2:
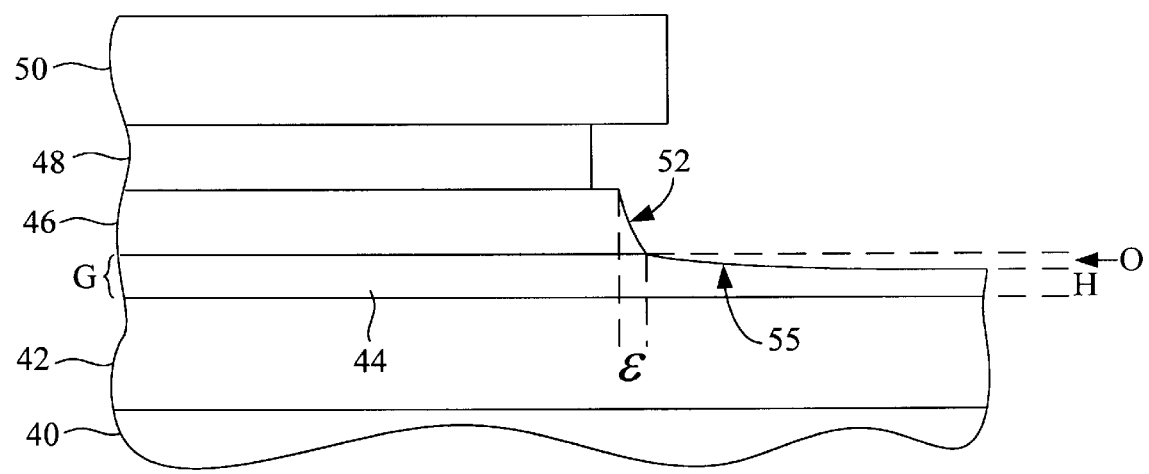
FIG. 2 is a side view of the formation of a sensor of the present invention having a blunt contiguous junction and a low milling rate read gap material.

FIG. 2 shows the result of a directional etching step in the formation of an MR sensor of the present invention. Atop a substrate 40 which may be composed of $Al_2O_3$ (alumina), AlTiC or other known materials, a first shield layer 42 of ferromagnetic material, such as NiFe, is formed. A read gap layer 44 of slow-ion-milling-rate material is then formed, and an MR sensor 46 is formed atop the read gap 44. To facilitate understanding of the present invention, the MR sensor 46 is shown as a single structure, but typically includes plural layers. A mask is patterned atop the sensor 46, the mask including an overcoat 50 and an undercoat 48 that forms an undercut to allow lift off after ion milling.

The read gap layer 44 may be formed of a variety of materials having a milling rate that is substantially less than that of conventional read gap materials such as $AL_2O_3$ or AlN. Preferred slow-ion-milling-rate materials include polycrystalline diamond-like carbon (DLC), cubic-BN, $ZrO_2$, MgO, $Nb_2O_5$, $Y_2O_5$, $HfO_2$, $BaTiO_3$ and $TiO_2$. A slow-ion-milling-rate material is defined in the present to be a material that is removed by conventional ion milling at less than two-thirds the rate at which alumina is removed. Polycrystalline DLC, for example, has an ion-beam-milling rate that is about one-fourth that of alumina. Cubic-BN has similar hardness, which can be significantly harder than amorphous DLC. The milling rate of the read gap is also substantially less than that of most MR sensor layers, which may be predominantly comprised of NiFe. Other similar directed impact removal or directional etching techniques such as sputter etching are generally encompassed by the term ion milling.

The significant difference in milling rates between the sensor 46 and the gap layer 44 creates a border 52 for the sensor that has a significantly steeper slope than the adjoining surface 55 of the gap layer. Generally the steeper slope 52 is created with a longer overmilling time. With the steep slope 52, a lateral extent $\epsilon$ of the border is also greatly reduced, so that the sensor has a much more sharply defined width, which can read bits on a track much more accurately. Stated differently, the border extends substantially less in a direction of the width of the sensor than in a direction perpendicular to that width. This border 52 will subsequently form a contiguous junction with bias and/or lead layers for the sensor.

A thickness of the read gap 44 under the sensor 46 is labeled G, an overmill depth is labeled O, and a thickness of the read gap 44 away from the sensor is labeled H, where G=H+O. The thickness G directly contributes to sensor resolution, such that a thinner G leads to better resolution. H is determined by the requirement of electrical insulation between the shield 42 and bias or lead layers that will be formed atop border 55 to abut border 52 and provide electrical connections to the sensor 46. O is equal to the time spent overmilling multiplied by the ion-milling rate of the read gap layer 44. A longer overmilling time generally results in a steeper slope for border 52, so that the slower ion milling rate materials of the present invention allow O and H to be standard dimensions and still obtain a steep slope for that border 52. A steeper slope for border 52 provides increased accuracy to the sensor's track-width dimension, measured essentially perpendicular to the path of recorded tracks, improving resolution in that direction.

On the other hand, overmilling for a standard length of time will leave the overmill depth O for the low-ion-milling rate gap materials of the present invention less than that for a conventional alumina gap, so that the thickness of the read gap G can be reduced without reducing the thickness H. The thickness H can also be reduced, however, since the materials chosen for the gap layer 44 can be more impervious to electrical shorting by having reduced defects or porosity, for instance. Since both O and H can be reduced, the overall gap G can be made much smaller. Such a thinner read gap layer 44 provides higher resolution for the sensor along the direction of recorded tracks, improving linear resolution. While conventional read gaps may average 50 nm–100 nm, the impervious read gap materials employed in the present invention are preferably formed to a thickness of 200 Å–800 Å currently, while gap layers of less than 100 Å are clearly possible, and gaps as thin as 60 Å may be achievable.

It is also possible to have a longer overmilling time and a reduced overmilling depth to form a sensor with a steeper border 52 but smaller read gap G. Such a sensor has improved resolution in both linear and track-width directions, greatly increasing overall resolution.

Since the read gap 44 is formed prior to formation of the sensor layers, the gap 44 may be formed under conditions that would not be possible once the delicate sensor has been formed. For example, a DLC read gap may be formed at temperatures ranging between 400° C. and 900° C. in order to create crystalline or polycrystalline carbon having tetrahedral bonds, as opposed to amorphous DLC that is formed at lower temperatures (typically room temperature). Cubic-BN can be deposited at 400° C. and has a hardness that may be several times that of amorphous DLC. MR sensor layers are likely to be damaged at temperatures of 250° C. or higher, while polycrystalline carbon may be formed at temperatures as low as 300° C., although higher temperatures are preferable and generally result in better quality films. Crystalline carbon, polycrystalline carbon and cubic-BN have lower ion milling rates than amorphous carbon, and thus are preferred for the read gaps of the present invention. Other slow milling rate read gap materials may also benefit from high temperature formation. Another means for forming tetrahedral carbon (ta-C) for the read gap 44 is by filtered cathodic arc deposition, as described in commonly assigned application entitled Improved Insulator Layers For Magnetoresistive Transducers, invented by Knapp et al., which is incorporated herein by reference.

Figure 3:
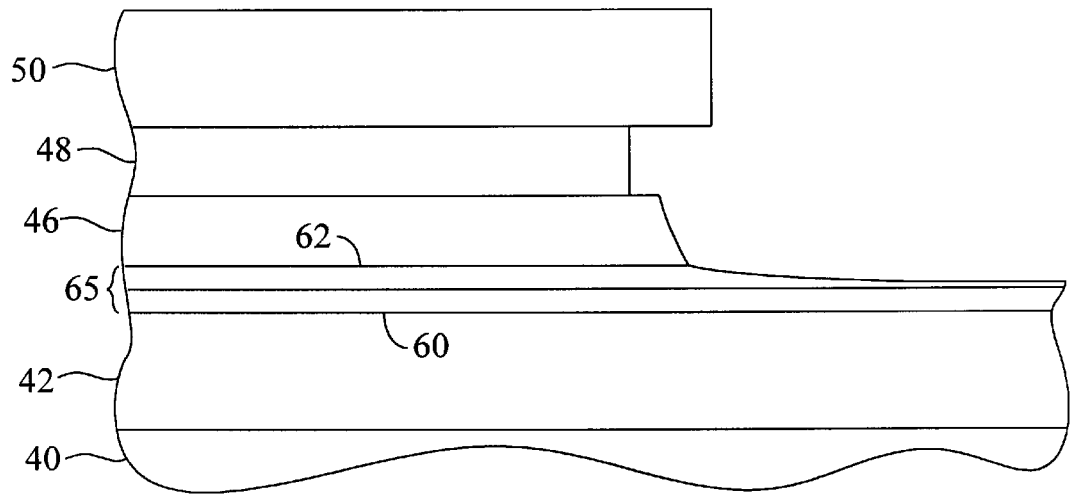
FIG. 3 is a side view of the formation of a sensor of the present invention having a blunt contiguous junction and a read gap having plural layers with at least one of the layers having a low milling rate.

A variation of the present invention is shown in FIG. 3, in which plural read gap layers are provided, at least one of the layers having a significantly lower milling rate than is conventional. In this embodiment, which has similar elements as disclosed above, a first layer 60 and a second layer 62 together form a read gap 65 that separates the sensor 46 from the shield 42. A thin adhesion layer, not shown, may be deposited before or between the gap layers. The two layers 60 and 62 are designed to compliment each other and improve the characteristics of the read gap 65. For instance, the second layer 62 may be relatively impervious to ion milling but electrically more conductive and/or thermally less conductive, while the first layer 60 may have superior dielectric properties, high thermal conductivity, and/or low stress but high ion milling rate.

Examples of slow-ion-milling-rate materials that may be employed for the second layer 62 include TiC, TaC, SiC, $B_4C$, WC, $TiB_2$, $TaB_2$, $AlB_{12}$, C, DLC, cubic-BN, $B_4N$, BCN, $\beta$-$C_3N_4$, ZrC, VC, $NbB_2$, $W_2B_5$, $LaB_6$, or $SiB_6$. The first layer 60 can be formed of complimentary materials that are, for example, electrically insulative, such as $AL_2O_3$, AlN or $SiN_x$. The second layer can be formed to a thickness corresponding to a desired overmilling time, so that after overmilling the exposed portion of the second layer is removed but the first layer is left substantially intact. Such a thickness may be as low as about 20 Å to 100 Å, although a greater thickness is possible.

In some cases it may be desirable to form a relatively impervious gap layer 60 first and then coat it with another more workable layer 62, for instance to serve as a template for sensor formation. Certain highly stressed materials, such as cubic-BN or DLC, may be used as a thin first gap layer 60 and then coated with an even thinner second layer 62 of $AL_2O_3$, AlN or $SiN_x$ for example. Depending on a number of factors, the first and second layers 60 and 62 may each have a thickness in a range between about 40 Å and 400 Å. Further, the high-stress layer may be formed on a thin adhesion layer of $AL_2O_3$, AlN or $SiN_x$, so that the high-stress, low ion milling rate layer is sandwiched by the lower stress, faster ion milling rate layers. For this situation, the high-stress, low ion milling rate layer may have a thickness in a range between about 40 Å and 400 Å, while the lower stress, faster ion milling rate layers have a thickness in a range between about 10 Å and 100 Å. By monitoring for the detection of materials from the first layer 60, second layer 62 and/or any other layers, for example by optical emission spectroscopy, termination of milling can be accurately controlled and the gap 65 made thinner.

Figure 4:
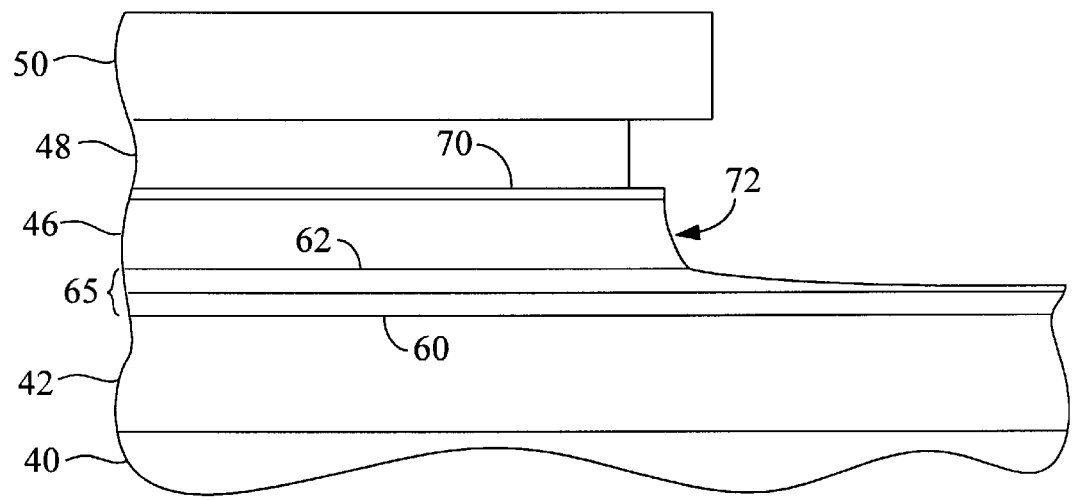
FIG. 4 is a side view of the formation of a sensor of the present invention having a blunt contiguous junction and a low milling rate read gap material along with a low milling rate cap on the sensor.

As shown in FIG. 4 very thin, slow-ion-milling-rate cap layer 70 may be formed atop the sensor layers prior to ion milling, in order to provide protection for the top of the sensor 46, causing a further increase in the steepness of the sensor end 72 that is to form a contiguous junction. For sensor having a soft adjacent layer adjoining this layer 70, the cap layer 70 can be composed of conductive materials, such as about 20 Å–80 Å TiC or TaC. Such a layer 70 may instead be formed of other nonconductive materials mentioned above, for instance about 30 Å–100 Å DLC.

Figure 5:
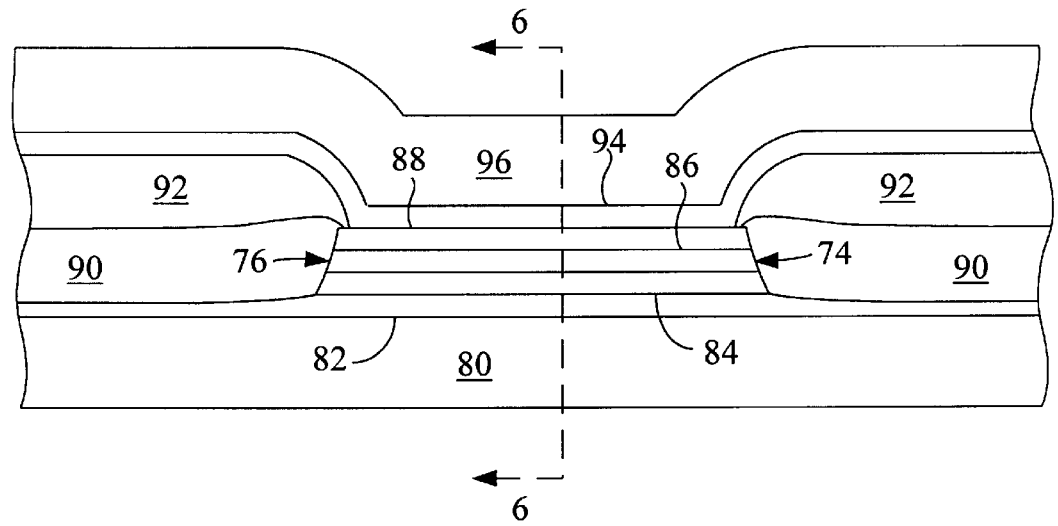
FIG. 5 is a view of a disk-facing portion of an AMR sensor formed according to FIG. 2 having blunt contiguous junctions with bias and conducting layers.

FIG. 5 shows an AMR sensor that has been constructed according to the present invention. A shield 80 of Permalloy or similar material has been formed atop a substrate, not shown in this figure. For the situation in which the shield 80 may be heated to elevated temperatures during formation of a read gap, the shield may be formed of CoZn, CoTa or FeAlN based materials. An a magnetic layer 82 of slow-ion-milling-rate material such as those mentioned above has been formed on the shield, the amagnetic layer 82 providing a mill stop as well as a read gap of the present invention. Although shown as a single layer 82 for clarity, the read gap may instead be formed of plural layers, as described above. The layer(s) 82 preferably have a thickness ranging between 80 Å and 800 Å, although greater and lesser thicknesses are possible. Layers 84, 86 and 88 form an AMR sensor element with a soft adjacent layer (SAL) bias element. The SAL layer 84, made of a low-coercivity, high-permeability magnetic material such as NiFeRh, is disposed adjacent to the AMR sensing layer 88. To prevent electrical shorting, a thin insulating or highly resistive layer 86 is interposed. The layer 86 may be composed of insulators such as $SiO2_2$, $Ta_2O_5$ or $AL_2O_3$, or for example a high-resistivity phase of Ta. The AMR sensing layer 88 may be conventionally formed of a material having an AMR effect, such as Permalloy, and may have a thickness preferably between 80 Å and 400 Å. A sensing current flowing in layer 88 in a direction that is generally parallel to the air bearing surface (ABS) of the head, for example from left to right in FIG. 5, produces a vertical (with respect to the ABS) magnetic field in the SAL layer 84. This magnetic field magnetizes the SAL layer 84 in the vertical direction (into the page in the example of FIG. 5). The magnetization of the SAL layer 84 in turn generates a magnetic bias field for the MR element 88 (out of the page in the example of FIG. 5). This magnetic field complements the magnetic field from the medium that is sensed in the MR element to produce a linear signal.

Sensor ends 74 and 76 are formed by ion milling and have a relatively steep slope due to overmilling of the read gap layer 82, but the slow-ion-milling-rate of the read gap prevents the milling from piercing that layer 82. A bias layer 90 of hard magnetic materials such as CoCrPt is formed on the read gap 82, abutting layers 84, 86 and 88 of the sensor, and covering a mask not shown in this figure but similar to layers 48 and 50 of FIGS. 2–4. A thin underlayer such as Cr may be formed prior to the hard bias layer of CoCrPt. A conductive layer 92, which may be composed of Au, Cu, Ta or other known materials is then formed, and mask layers such as 48 and 50 are etched away, leaving layers 90 and 92 as shown in FIG. 5. Thin adhesion or cap layers may be formed before or after the hard bias and lead layers. A second amagnetic read gap 94 is formed, followed by a second magnetic shield 96. The second shield may serve as part of a write transducer, not shown, as is known. The sensor shown in FIG. 5 provides a view from a storage media surface, although an overcoat of material such as diamond-like carbon (DLC) may protect the sensor from corrosion and from contact with the disk, tape or other media.

Figure 6:
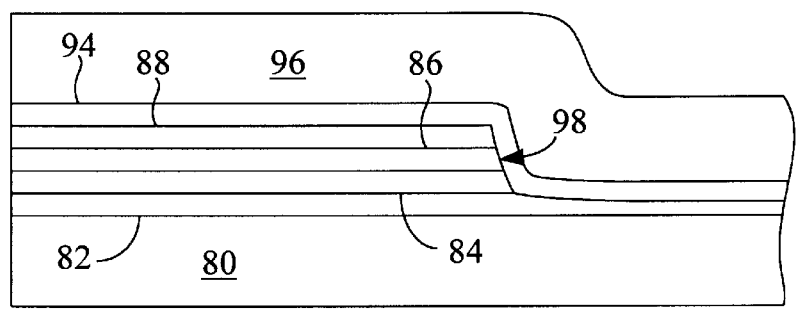
FIG. 6 is a cross-sectional view of the sensor of FIG. 5, showing a blunt junction for the sensor distal to the disk-facing surface.

FIG. 6 is a cross-sectional view of the sensor taken along arrows 6—6 of FIG. 5. Another blunt junction 98 can be seen from this view, which may be ion milled during different steps from that which created ends 74 and 76. The junction is coated with the second read gap layer 94, and blunt junction 98 enables better stripe height definition and process control, without residue. As with the contiguous junction formed by ends 74 and 76, junction 98 can be seen to form an obtuse, nearly 90° angle to the ion milled surface of read gap layer 84.

Figure 7:
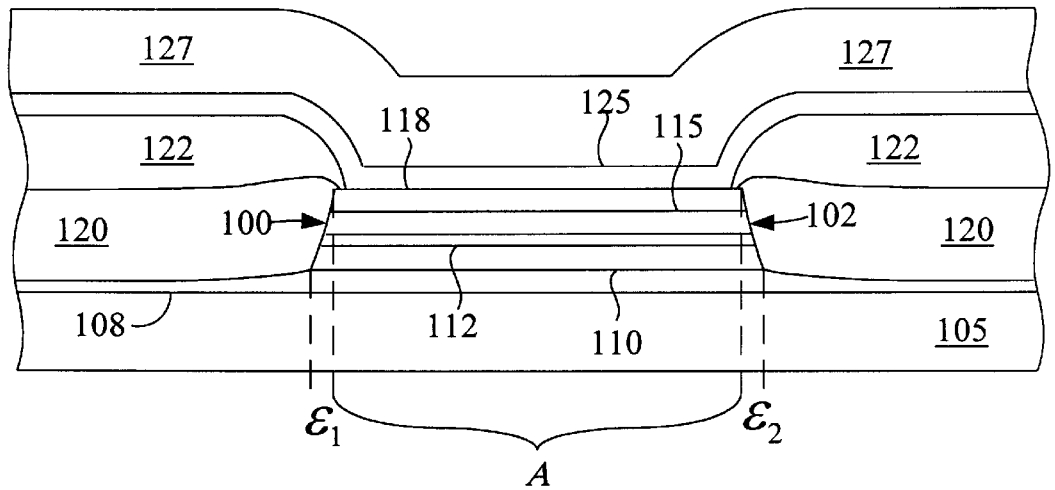
FIG. 7 is a view of a disk-facing portion of a GMR sensor formed according to FIG. 2 having blunt contiguous junctions with bias and conducting layers.

FIG. 7 shows a spin-valve head formed with blunt contiguous junctions 100 and 102. Like the AMR head described above, the SV head begins with formation of a magnetic shield layer 105 atop a substrate, not shown. Atop the shield layer a read gap 108 of amagnetic material is formed. Similar to the above discussion regarding AMR sensors, this gap 108 may be formed as an homogenous layer of slow-milling-rate material or may include plural layers of amagnetic material, at least one of which is a slow-milling-rate material, and may include thin adhesion layers. Atop the read gap layer a first layer 110 of ferromagnetic material is formed, which may comprise CoFe for example. A thin amagnetic conductor layer 112, which may comprise Cu for example is then formed, followed by a second layer 115 of ferromagnetic material such as CoFe. A pinning layer 118, which may be formed of antiferromagnetic material such as MnFe, is then formed on the second ferromagnetic layer 115, to fix the magnetization direction of pinned layer 115.

An alternative formation of the SV sensor which may be preferred essentially reverses the sequence of forming the sensor layers, beginning with forming a Ta or other seed layer, followed by forming an antiferromagnetic layer, a pinned layer, a spacer layer and then a free layer in that order. Also, the free layer may include plural layers, and/or the pinned layer may include plural layers to form a synthetic sensor.

As described above with reference to FIG. 2, a mask is formed over the sensor layers 110, 112, 115 and 118, including undercuts near the desired ends of the sensor, the ends disposed at contiguous junctions 100 and 102. The ends are formed by ion milling and having a relatively steep slope due to milling the read gap layer 108 as well as the sensor layers, but the slow-ion-milling-rate of the read gap prevents the milling from piercing that layer 108 even while the sensor ends are made blunt. A bias layer 120 of hard magnetic materials such as CoCrPt is formed on the read gap 108, abutting layers 110, 112, 115 and 118 of the sensor, and covering the mask. As mentioned above, an underlayer of Cr may be deposited prior to the hard bias layer 120. A conductive layer 122, which may be composed of Au, Cu or other known materials is then formed, and the mask layers etched away, leaving bias layer 120 abutting sensor layers 110, 112, 115 and 118 at steep contiguous junctions 100 and 102. An underlayer and/or cap layer of Ta for example may deposited before and/or after the lead layer. A second amagnetic read gap 125 is formed, followed by a second magnetic shield 127. The second shield may serve as part of a write transducer, not shown, as is known. The sensor shown in FIG. 7 provides a view from a storage media surface, although an overcoat of material such as diamond-like carbon (DLC) may protect the sensor from corrosion and from contact with the disk, tape or other media.

An active region A of the sensor can be seen to extend much further in a direction parallel to the sensor layers 110, 112, 115 and 118 than the lateral extent $\epsilon_1$ and $\epsilon_2$ of contiguous junctions 100 and 102. Moreover, contiguous junctions 100 and 102 extend much further in a direction perpendicular to those layers 110, 112, 115 and 118 than in a direction parallel to those layers.

Construction of a GMR head follows similar sequences of steps as described above for a SV head, although with additional interleaved magnetoresistive and amagnetic conductor layers. Likewise, DSMR and DSV heads can be formed with the above process for forming steeply sloped contiguous junctions. While the above description is meant to illustrate a few types of MR sensors, many variations in forming sequences of layers similar to those described above are possible, in order to produce other varieties of MR heads with blunt contiguous junctions. In sum, the improved tailoring of various MR sensors achieved by the present invention provides advantages in magnetic characteristics and resolution that greatly enhance transducer performance.

What is claimed is:

1. A transducer comprising:
    a magnetoresistive sensor containing plural layers disposed substantially parallel to a plane, said layers terminating at an end extending at a first angle from said plane,
    an amagnetic layer adjoining said magnetoresistive sensor along a first interface substantially aligned with said plane, said first interface terminating at said end and said amagnetic layer having a second interface extending from said end at a second angle to said plane, said second angle being substantially less than said first angle, wherein said amagnetic layer essentially contains at least one material from the group consisting of polycrystalline DLC, ta-C, cubic-BN, $AlB_{12}$, $ZrO_2$, $Nb_2O_5$, $Y_2O_5$, $HfO_2$, MgO, and $BaTiO_3$, and
    a metal layer adjoining said end along a junction and adjoining said amagnetic layer along said second interface, whereby said metal layer provides a bias to said sensor without penetrating said amagnetic layer.

2. The transducer of claim 1, wherein said amagnetic layer has an ion milling rate that is substantially less than that said sensor.

3. The transducer of claim 1, further comprising a magnetic shield adjoining said amagnetic layer and separated from said metal layer.

4. The transducer of claim 1, wherein said junction has an extent in a direction perpendicular to said plane that is substantially greater than an extent of said junction in a direction parallel to said plane.

5. The transducer of claim 1 wherein said amagnetic layer contains plural amagnetic lamina, and at least one of said lamina contains a slow-ion-milling-rate material.

6. The transducer of claim 5, wherein said amagnetic layer essentially contains at least one material from the group consisting of TiC, TaC, SiC, $B_4C$, WC, $TiB_2$, $TaB_2$, $\beta$-$C_3N_4$, $B_4N$, BCN, ZrC ZrN, VC, $NbB_2$, $W_2B_5$, $LaB_6$ and $SiB_6$.

7. The transducer of claim 1, wherein said amagnetic layer has a thickness in a range between about 60 Å and 800 Å.

8. The transducer of claim 1, wherein said amagnetic layer has a thickness less than that of one of said sensor layers.

9. A transducer comprising:
    a magnetoresistive sensor containing plural layers disposed substantially parallel to a plane, said layers terminating at an end extending at a first angle from said plane,
    an amagnetic layer adjoining said magnetoresistive sensor along a first interface substantially aligned with said plane, said first interface terminating at said end and said amagnetic layer having a second interface extending from said end at a second angle to said plane, said second angle being substantially less than said first angle, wherein said amagnetic layer contains DLC formed at a temperature greater than about 300° C., and
    a metal layer adjoining said end along a function and adjoining said amagnetic layer along said second interface, whereby said metal layer provides a bias to said sensor without penetrating said amagnetic layer.

10. A transducer comprising:
    a magnetoresistive sensor formed of a plurality of layers that terminate at a substantially blunt end,
    a metal layer abutting said end and biasing said sensor,
    a read gap containing a plurality of adjoining amagnetic layers, at least one of which adjoins said sensor and said metal layer, and
    a magnetic shield separated from said sensor by said read gap wherein at least one of said amagnetic layers contains DLC that has been heated to at least about 300° C.

11. The transducer of claim 10, wherein at least one of said amagnetic layers contains a slow-ion-milling-rate material.

12. The transducer of claim 10, wherein at least one of said amagnetic layers has a thickness in a range between about 20 Å and 100 Å.

13. The transducer of claim 10, wherein at least one of said amagnetic layers has a thickness less than that of one of said sensor layers.

14. The transducer of claim 10, wherein said metal layer forms a junction with said end and said metal layer forms an interface with said read gap layer, such that said junction joins said interface at an obtuse angle.

15. The transducer of claim 10, wherein said plurality of sensor layers are substantially parallel to a plane, and said end has an extent in a direction perpendicular to said plane that is substantially greater than an extent of said end in a direction parallel to said plane.

16. A transducer comprising:
    a magnetoresistive sensor formed of a plurality of layers that terminate at a substantially blunt end, a metal layer abutting said end and biasing said sensor, a read gap containing a plurality of adjoining amagnetic layers, at least one of which adjoins said sensor and said metal layer, and a magnetic shield separated from said sensor by said read gap, wherein at least one of said amagnetic layers contains at least one material from the group consisting of polycrystalline DLC, ta-C, cubic-BN, $AlB_{12}$, $ZrO_2$, $Nb_2O_5$, $Y_2O_5$, $HfO_2$, MgO and $BaTiO_3$.

17. A transducer comprising:

a magnetoresistive sensor formed of a plurality of layers that terminate at a substantially blunt end, a metal layer abutting said end and biasing said sensor, a read gap containing a plurality of adjoining amagnetic layers, at least one of which adjoins said sensor and said metal layer, and a magnetic shield separated from said sensor by said read gap, wherein at least one of said amagnetic layers contains at least one material from the group consisting of polycrystalline DLC, ta-C, TiC, TaC, SiC, $B_4C$, WC, $TiB_2$, $TaB_2$, $AlB_{12}$, cubic-BN, $B_4N$, BCN, $\beta$-$C_3N_4$, ZrC, ZrN, VC, $NbB_2$, $W_2B_5$, $LaB_6$ and $SiB_6$.

18. A method for forming a transducer comprising:

forming a metal layer, forming an amagnetic layer over said metal layer such that said amagnetic layer has an ion milling rate substantially less than that of alumina, including selecting a material for forming said amagnetic layer from the group consisting of polycrystalline DLC, ta-C, $TiO_2$, cubic-BN, $AlB_{12}$, $ZrO_2$, $Nb_2HfO_2$, MgO and $BaTiO_3$, forming a plurality of sensor layers over said amagnetic layer, including forming at least one magnetoresistive layer, forming a mask over an active area of said sensor layers, removing by ion milling a portion of said sensor layers that is not covered by said mask, including removing said portion at a substantially greater rate than said ion milling rate of said amagnetic layer, thereby forming an end to said sensor layers and a top to said amagnetic layer, forming a metal layer contiguous to said end and to said top, and removing said mask.

19. The method of claim 18, further comprising forming an initial amagnetic layer atop said metal layer prior to said forming said amagnetic layer.

20. The method of claim 18, further comprising forming a layer of slow-ion-milling-rate material atop said sensor layers prior to forming said mask.

21. The method of claim 18, wherein said removing by ion milling includes varying a direction of said ion milling.

22. A method for forming a transducer comprising:

forming a metal layer, forming first and second amagnetic layers atop said shield layer, at least one of said amagnetic layers having an ion milling rate substantially less than that of alumina, including selecting a material for forming at least one of said amagnetic layers from the group consisting of TiC, TaC, SiC, $B_4C$, WC, $TiB_2$, $TaB_2$, $AlB_{12}$, $\beta$-$C_3N_4$, cubic-BN, $B_4N$, BCN, ZrC, ZrN, VC, $NbB_2$, $W_2B_5$, $LaB_6$, $SiB_6$, forming a plurality of sensor layers over said amagnetic layer, including forming at least one magnetoresistive layer, forming a mask over an active area of said sensor layers, removing by ion milling a portion of said sensor layers that is not covered by said mask, including removing said portion at a substantially greater rate than said ion milling rate of said amagnetic layer, thereby forming an end to said sensor layers and a top to said amagnetic layer, forming a metal layer contiguous to said end and to said top, and removing said mask.

23. A method for forming a transducer comprising:

forming a metal layer, forming an initial amagnetic layer atop said metal layer, forming a subsequent amagnetic layer over said initial amagnetic layer such that said subsequent amagnetic layer has an ion milling rate substantially less than that of alumina, forming a plurality of sensor layers over said amagnetic layer, including forming at least one magnetoresistive layer, forming a mask over an active area of said sensor layers, removing by ion milling a portion of said sensor layers that is not covered by said mask, including removing said portion at a substantially greater rate than said ion milling rate of said amagnetic layer, thereby forming an end to said sensor layers and a top to said amagnetic layer, forming a metal layer contiguous to said end and to said top, removing said mask, monitoring for the presence of particles from said initial amagnetic layer during said removing by ion milling, and controlling said ion milling based upon said monitoring.

24. A method for forming a transducer comprising:

forming a metal layer, forming an amagnetic layer over said metal layer such that said amagnetic layer has an ion milling rate substantially less than that of alumina, wherein forming said amagnetic layer includes heating said amagnetic layer to a temperature greater than about 300° C., forming a plurality of sensor layers over said amagnetic layer, including forming at least one magnetoresistive layer, forming a mask over an active area of said sensor layers, removing by ion milling a portion of said sensor layers that is not covered by said mask, including removing said portion at a substantially greater rate than said ion milling rate of said amagnetic layer, thereby forming an end to said sensor layers and a top to said amagnetic layer, forming a metal layer contiguous to said end and to said top, and removing said mask.

* * * * *